Dec. 20, 1966  E. G. MEYER  3,292,421
PARAMAGNETIC GAS ANALYZER
Filed June 24, 1965  5 Sheets-Sheet 1

INVENTOR.
EMILIO G. MEYER.
BY
Brown, Critchlow, Flick & Peckham.
his
ATTORNEYS.

Dec. 20, 1966  E. G. MEYER  3,292,421
PARAMAGNETIC GAS ANALYZER
Filed June 24, 1965
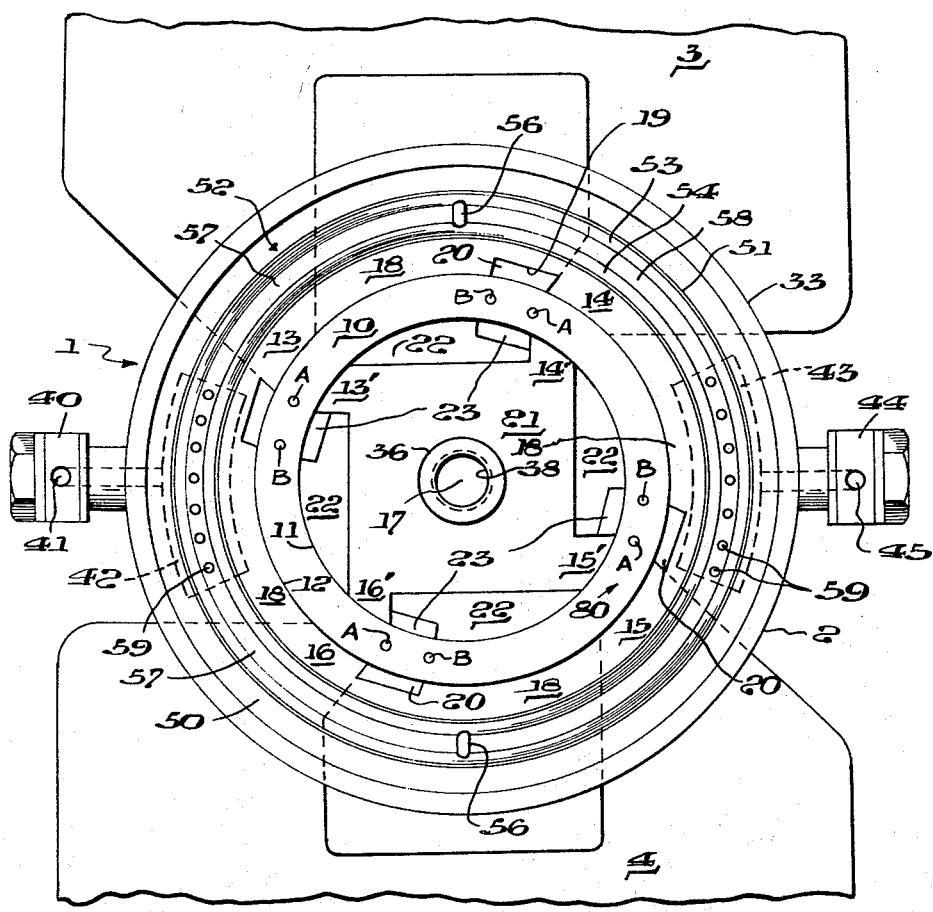
Fig. 2.
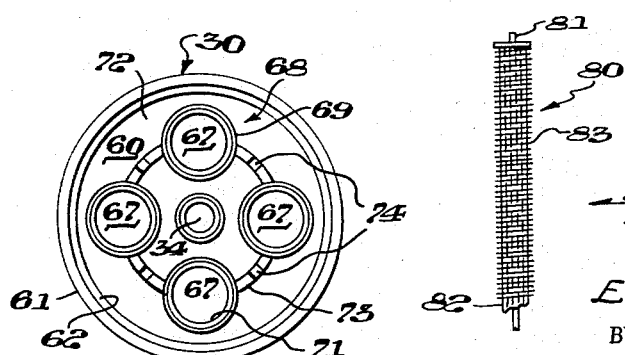
Fig. 3.
Fig. 4.
INVENTOR.
EMILIO G. MEYER.
BY
Brown, Critchlow, Flick & Peckham.
his ATTORNEYS.

United States Patent Office

3,292,421
Patented Dec. 20, 1966

3,292,421
PARAMAGNETIC GAS ANALYZER
Emilio G. Meyer, Milan, Italy, assignor to Mine Safety
Appliances Italiana, S.p.A., Milan, Italy
Filed June 24, 1965, Ser. No. 468,673
Claims priority, application Canada, Apr. 23, 1965,
928,923
21 Claims. (Cl. 73—27)

This application is a continuation-in-part of application, Serial No. 362,703, filed April 27, 1964, and now abandoned.

This invention relates to a gas analyzer for the continuous determination of the presence and concentration of a paramagnetic gas in a gaseous mixture. The invention has particular application to the determination of the presence and concentration of oxygen in a mixture with various other gases, especially where those other gases are diamagnetic.

The unique paramagnetic properties of oxygen have stimulated a number of investigations into methods of measuring oxygen concentration in gas mixtures by magnetic means. Some of the instruments devised for this purpose operate on the principle that the magnetic susceptibility of oxygen varies inversely with its temperature and that, by heating a portion of an oxygen-containing mixture in a non-homogeneous magnetic field inside a test chamber, there is created a so-called "magnetic wind," which can be measured by its thermal effect on an electrical resistance element. The present invention relates gnerally to an improved instrument of this type.

It is among the objects of this invention to provide a paramagnetic gas analyzer that will permit the fullest practicable realization of theoretical design principles, particularly as to the location of the electrical resistance elements relative to the magnetic field and to each other under different conditions; that will have maximum sensitivity to the paramagnetic gas to be detected and measured; that will provide accurate determinations, under different ambient conditions, of paramagnetic gas concentrations in mixtures containing a variety of background gases; and that will be simple to make, compact to carry, and easy to use.

The foregoing and other objects of the invention will be apparent from the following description of a preferred embodiment, in connection with the attached drawings, in which FIG. 1 is a partly exploded view of the test cell, with some of the elements shown partly in section;

FIG. 2 is a fragmentary plan view, partly in section and somewhat enlarged, of the test cell of FIG. 1 with one of the end caps removed to show the test chamber and the disposition of the filaments therein;

FIG. 3 is a plan view of the inner face of one of the end caps of the test cell;

FIG. 4 is an enlarged, fragmentary view of one of the filaments in the test cell;

The paramagnetic gas analyzer of this invention includes a test chamber having a generally circular side wall and a strong magnetic field extending across the chamber for providing circumferential gas flow in the chamber in the presence of a paramagnetic gas therein. Disposed inside the chamber, and extending in a direction substantially perpendicular to the direction of (1) the lines of maximum magnetic force therein, and (2) the circumferential gas flow therein, is a pair of elongated temperature sensitive electrical resistance filaments. The first filament of the pair is located in a region of the magnetic field where the product of the field intensity and the circumferential field intensity gradient is a maximum; and the second filament is located in close proximity to the first filament, but in a region of the magnetic field where the product of the field intensity and the circumferential field intensity gradient is a minimum. Both filaments are heated electrically to substantially the same temperature in the absence of a paramagnetic gas. In the presence of such a gas, there will be a thermomagnetic gas flow circumferentially of the chamber in the direction of decreasing magnetic field intensity adjacent the first filament. This gas flow will tend to cool the upstream filament and, because of heat transferred from that filament to the downstream filament, to heat the latter. The resulting difference in the temperatures of the two filaments will be proportional to the amount of gas flow and therefore to the concentration of the paramagnetic gas causing that flow. Among the further features of this invention are the provision of (1) an annular test chamber having a substantially cylindrical outer wall to reduce the energy required to sustain a given rate of gas flow within the chamber; (2) means for mounting the filaments so that at least one, and preferably both, of them can be moved circumferentially of the test chamber for adjusting the filaments position therein relative to the magnetic field and to the other filament; (3) a plurality of magnetic fields across separate circumferential portions of the test chamber and a separate pair of filaments associated with each such field, these filaments being so disposed relative to the magnetic fields and to each other that their useful wind generating and sensing effects are cumulative; (4) means to increase the transfer of heat by the gas stream from the upstream filament to the downstream filament; and (5) a special electrical network interconnected with the filaments in such a way that the cooling effect of the magnetic wind on the upstream filaments and the heating effect of the same wind on the downstream filaments will result in additive electrical responses.

Figure 1:
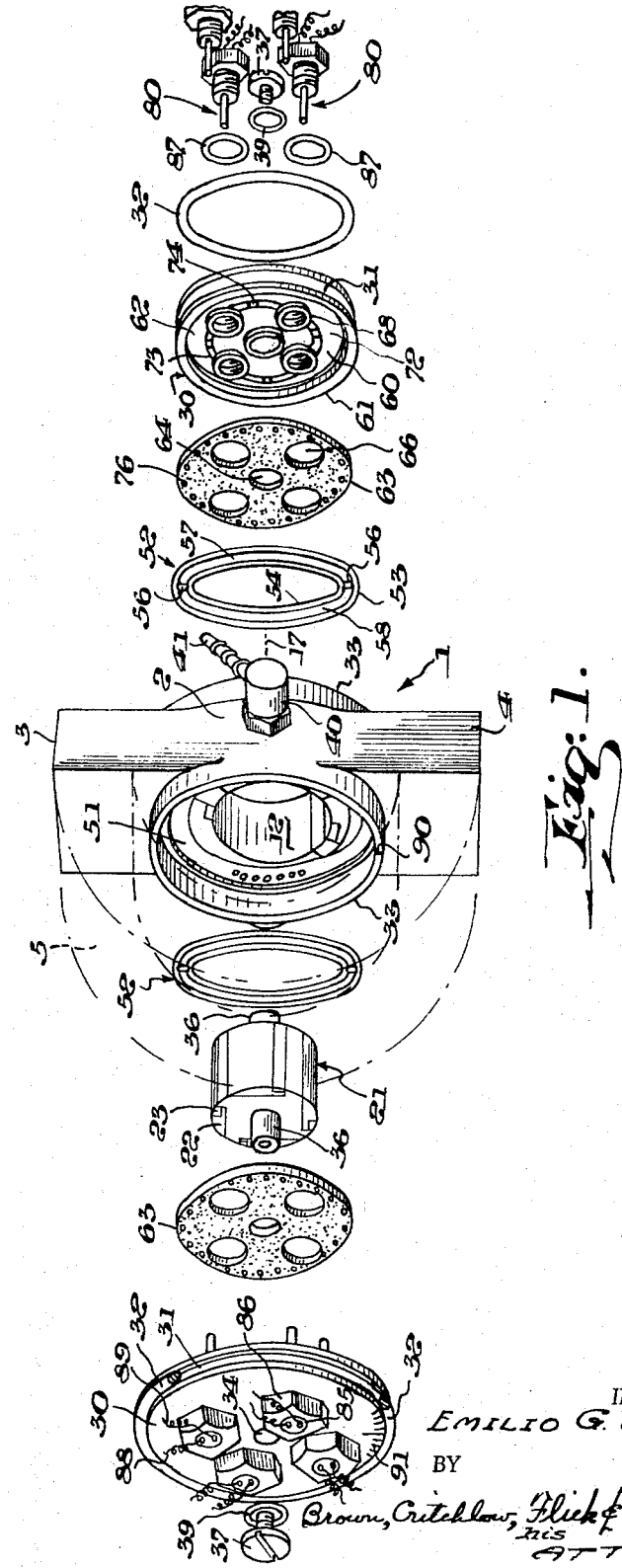

Referring to the drawings, the gas analyzer of this invention includes a test cell 1. The central portion of this cell consists of a cell body 2 that includes external pole pieces 3 and 4, which are adapted to be magnetically coupled with a permanent magnet 5 (shown somewhat diagrammatically in broken lines in FIG. 1). Within the test cell is an annular test chamber 10 (see FIG. 2), bounded by substantially cylindrical inner and outer walls 11 and 12, respectively. The outer wall 12 is formed in part by the arcuate faces of four pole piece extensions. Two of those extensions 13 and 14 are part of pole piece 3. The other two extensions 15 and 16 are part of pole piece 4. The circumferential faces of all four extensions are preferably symmetrically disposed about the longitudinal axis 17 of the chamber. Other portions of the outer wall 12 are formed of nonmagnetizable metal inserts 18 disposed between the pole piece extensions. These inserts may be of stainless steel or brass, in fact, of any material that is both non-magnetic and a good thermal conductor. A recess 19 is provided in each metal insert 18 adjacent one and the same side of each pole face, and each recess extends the length of chamber 10 and for a short circumferential distance around the chamber. In each recess is disposed a strip 20 of material that is both non-magnetic and a poor thermal conductor, such as a plastic material, for example, Teflon.

The inner wall 11 of the test chamber is formed by the outer surface of a cylindrical member 21, supported inside the cell body by means to be described later. This member is formed of elements similar to those making up the outer wall. They include complementary interior pole pieces 13', 14', 15' and 16' of soft iron or equivalent magnetic material disposed opposite the corresponding pole piece extensions on the outer wall. These complementary pole pieces form an integral mass through which pass the lines of magnetic flux from pole pieces 3 and 4. The other elements forming part of member 21 include non-magnetic thermal conducting metal inserts 22, corresponding to inserts 18 of the outer wall, and non-magnetic thermal insulating strips 23 corresponding to inserts 20 of the outer wall.

The ends of the annular test chamber 10 are closed by end caps 30, which are removably and adjustably mounted on cell body 2. Each cap is provided with a circumferential groove 31 around its outer edge, in which is fitted an O-ring 32 to provide a tight friction seal between the outer edge of the cap and the inner wall of one of the rings 33, extending from the top and bottom of cell body 2. Each cap is also provided with a central hole 34 for receiving a pin 36 projecting from each end of cylindrical member 21 to support that member inside the cell body. Member 21 is adjustably secured to the end caps, and the latter are held in sealed engagement with the cell body by two cap screws 37, which are screwed into tapped holes 38 in the ends of pins 36. Under the head of each cap screw is an O-ring 39 for sealing the opening 34.

To introduce a sample of the gaseous mixture to be tested, into the test chamber 10, the cell body 2 is provided with a gas inlet 40. This inlet includes a nipple 41 for connecting a flexible hose (not shown) to a source of the gaseous mixture. Inlet 40 communicates with an inlet chamber 42, which is located in the cell body radially outward of test chamber 10. A similar outlet chamber 43 is located in the diametrically opposite side of the cell body and communicates in turn with a gas outlet 44 and an outlet nipple 45. The latter may be connected by a flexible hose (not shown) with a pump (also not shown) for drawing the gaseous mixture through the cell body as hereinafter described.

The upper and lower sides of the cell body each has a face 50 that extends radially between test chamber 10 and ring 33; and each of these faces is provided with a shallow groove 51, in which is seated and partially received a double O-ring seal 52. This seal includes an outer O-ring 53, an inner O-ring 54 of slightly smaller diameter, and two radial strips 56 that connect the inner and outer rings together, so that they will lie concentrically in the same plane. Each seal defines two semicircular annular spaces 57 and 58, separated from each other by radial strips 56. When each seal is seated in its groove 51, the annular space 57 will communicate with inlet chamber 42 through holes 59 at the bottom of the groove; and the annular space 58 will communicate with outlet chamber 43 through similar holes. In the assembled test cell, the end caps 30 fit against the other sides of seals 52.

The inner face 60 of each end cap 30 is surrounded by a flange portion 61 extending towards the cell body 2. Supported on a seat 62 on the inside of this flange is a gas permeable disc 63, which may be made of sintered powdered metal. Each disc has five openings therethrough, the central opening 64 being aligned with opening 34 in the end cap for receiving pin 36 of member 21, and the other four openings 66 being symmetrically arranged around the central opening to register with similar openings 67 in the adjacent cap. In these latter openings, as described later, are placed the supports for the filaments. Mounted on the inner face 60 of each cap, and surrounding each of the openings 34 and 67, is an annular spacer 68. Each spacer is provided with a seat 69 that is spaced from face 60 the same distance as seat 62 on flange portion 61. The portions of each disc 63 adjacent the holes 64 and 66 therein rest on seats 69 and the edges of the holes fit closely around cylindrical projections 71 on the spacers 68.

The foregoing arrangement permits the discs 63 to be brazed to the end caps, not only around the outside edge of each disc, but also around the edge of each of the holes 64 and 66. When so assembled, the space between the inner face 60 of each end cap and its adjacent disc 63 forms a chamber 72. If desired, additional support for each permeable disc 63 may be provided by seating ridges 73, extending between seats 69 on spacers 68. Gas passages or grooves 74 may be cut in these ridges to permit gas flow throughout chamber 72. Around each disc near its outer edge, but inward of its supporting seat 62, are drilled a plurality of holes 76. These holes act as gas passages between chamber 72 and the annular spaces 57 and 58 in the adjacent double O-ring seal 52 when the end caps are in place on the cell body. Accordingly, in the assembled test cell, the gas mixture will flow successively through inlet 40, inlet chamber 42, holes 59, annular spaces 57 (one such space being defined by each double O-ring seal 52), holes 76, and so into each of the chambers 72 (one in each end cap). Gas will also flow out of both chambers 72 through other holes 76, annular spaces 58, holes 59, outlet chamber 43, and so to the gas outlet 44. At the same time, there will be some gas exchange between test chamber 10 and each chamber 72, through the gas permeable discs 63 separating those chambers. In this way, continuous flow of the gaseous mixture through the cell body is accompanied by continuous sampling of that mixture through the permeable discs into and out of the test chamber.

The heating elements for generating and measuring the magnetic wind, which is produced in test chamber 10 by the presence of a paramagnetic gas, are in the form of elongated filaments 80 and are desirably identical in physical and electrical properties. These filaments may take a number of forms, but a preferred embodiment includes a stiff wire core 81, surrounded by and supporting a thin ceramic cylinder 82, on which is spirally wound a temperature sensitive resistance wire 83. The filaments extend substantially the full length of the annular chamber 10 and are positioned therein parallel to the chamber axis 17. There is a separate pair of filaments for each separate circumferential magnetic field zone. In the embodiment shown in the drawings, there are four such zones, spaced approximately 90 degrees apart and corresponding in general circumferential extent to the width of the four pole faces of pole piece extensions 13–16 and their complementary pole pieces 13'–16'. In each zone, the lines of force in the region of maximum field intensity extend substantially radially across the test chamber and are substantially uniform over the width of the adjacent pole faces. It is most desirable that each filament that is responsible for contributing to the generation of a magnetic wind be located in a region where the maximum circumferential temperature gradient in the gaseous mixture created by the heating effect of that same filament coincides with the region where the product of the magnetic field intensity and the circumferential magnetic field intensity gradient is also at a maximum. By providing such coincidence, the instrument will have maximum sensitivity.

The magnetic wind generating filaments, herein specifically referred to as filaments A, are mounted approximately 90 degrees apart on one of the end caps 30. The sensing filaments, herein specifically referred to as filaments B, are similarly mounted on the other end cap. To provide for easy replacement of any filament, each one is mounted on a separate cylindrical plug 85 of electrical insulating material; and each plug forms a coaxial insert extending through a cap screw 86, which is threadably mounted in one of the holes 67 in end cap 30 and sealed with an O-ring 87. Wire leads 88 and 89 from each filament pass through the insulated plug and are connected to an electrical network to be described later. As shown in the drawings, each pair of filaments 80 is located adjacent one of the magnetic field zones and includes an A and a B filament. The A filament is located approximately in line with the same edge (here the counter-clockwise edge) of the adjacent pole face, representing the approximate region (1) where the product of the magnetic field intensity and the circumferential magnetic field intensity gradient is at a maximum, and (2) where the temperature gradient of the gaseous mixture heated by that filament is also at a maximum. Its companion B filament may be spaced a short distance away in a counter-clockwise direction, in a region where the product of the field intensity and the circumferential field intensity gradient is at a minimum. Generally speaking, the regions where the said product will be at a maximum, will be near the edge of a pole face (where both field intensity and gradient are high); and the regions where that product will be a minimum will be either (1) between the pole faces (where the field intensity is maximum, but the field gradient is substantially zero) or (2) in a region between successive pole faces (where both field intensity and gradient approach zero). However, the A and B filaments should be as close together as is consistent with the above considerations, so as to increase the heat transfer from the upstream filament to the downstream filament. Likewise, the region of maximum temperature gradient in the gaseous mixture adjacent an A filament will generally be very close to a radial plane containing both the longitudinal axis 17 of the test cell and the longitudinal axis of the filament in question, but may vary with the shape of the filament, the velocity of the magnetic wind, and other factors. The precise locations of these regions of maximum and minimum products and gradients will vary to some extent with each test cell and filament, but can be determined by adjustment of the filament locations, relative to the magnetic field and to each other, by rotating one or both end caps. In some cases, it will be found desirable to provide a witness mark 90 on the outer edge of each ring 33 and an angular scale 91 on the adjacent outer face of end cap 30, so that the end caps can be reassembled in the cell body without changing their previous orientation.

Filaments A and B of each pair of filaments are initially heated to an elevated temperature of around 200° C. above the ambient temperature, and as nearly as possible to the same temperature, in the absence of a paramagnetic gas. There will then be no measurable circumferential flow of gas in the test chamber. However, in the presence of a paramagnetic gas, those portions of the gas on one (here the counter-clockwise) side of each zone of high magnetic field intensity will be heated by the A filaments, while an equivalent portion of gas on the other (here the clockwise) side of the same zone will not be heated. The magnetic susceptibility of the heated portion will be reduced, so that the cool gas on the one (here the clockwise) side of the zone will be pulled into that zone displacing the warm gas on the other (here the counter-clockwise) side of the zone, thereby producing counter-clockwise flow of gas in the test chamber with the filaments arranged as shown in FIG. 2. The amount of that flow will be proportional to the concentration of the paramagnetic gas in the gaseous mixture within the chamber. The gas flow generated by the magnetic field will tend (in the embodiment illustrated in FIG. 2) to cool the A filaments, because those filaments give up heat in warming the gas, and to heat the B filaments, because some heat is transferred by the gas flow to the adjacent B filaments. In order to increase the temperature difference between the two filaments and therefore make the instrument more sensitive, the extraneous heat loss between the filaments is decreased by lining the adjacent walls of the test cell with the material 20 and 23 that is a poor heat conductor. At the same time, the amount of magnetic wind that is generated is increased by cooling the gas stream between pairs of filaments as nearly as possible to the ambient temperature by absorbing heat from that stream through the metal inserts 18 that are good thermal conductors.

Figure 5:
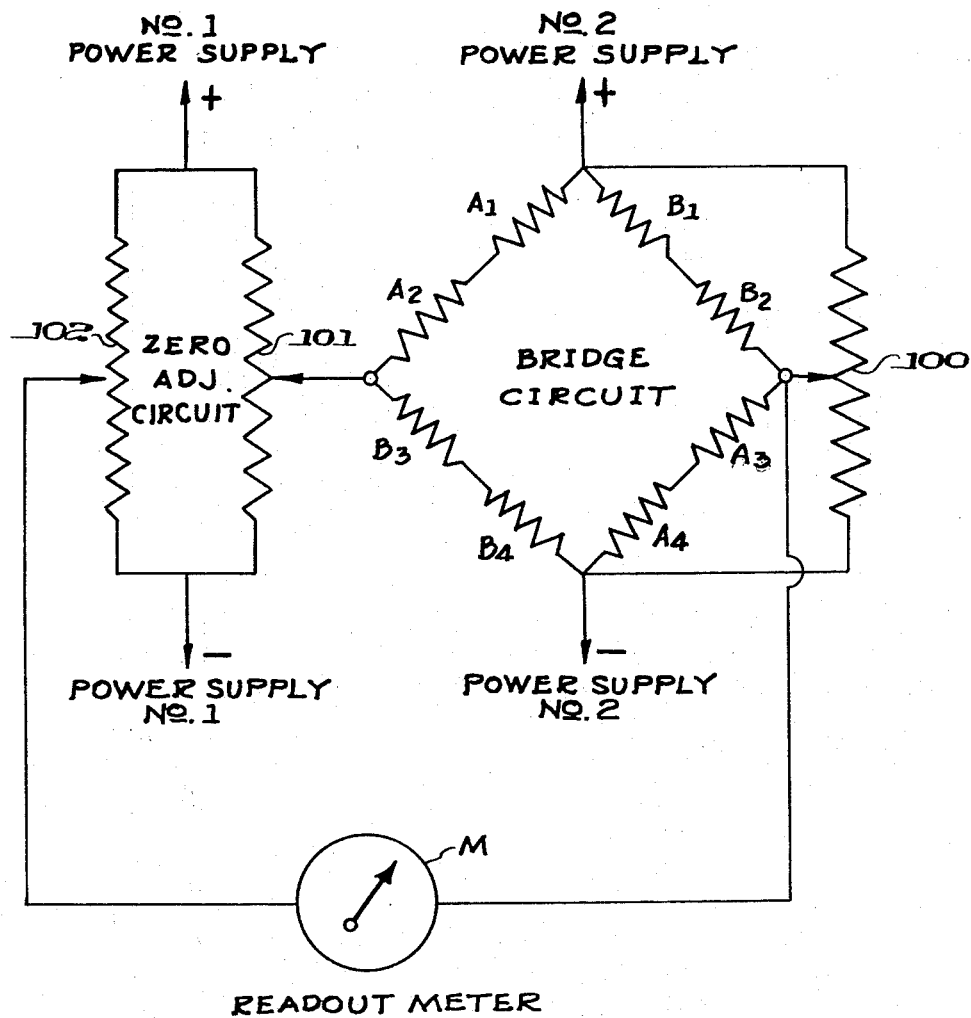
FIG. 5 is a schematic wiring diagram, showing the electrical network for measuring the differences in temperature between certain filaments in the test chamber to determine the concentration of a paramagnetic gas in that chamber.

In general, the electrical network for determining the concentration of a paramagnetic gas in the gaseous mixture within the test chamber includes (1) a measuring circuit and (2) a zero adjusting circuit, each of which may be provided with its own power supply, as shown in FIG. 5. The measuring circuit comprises a Wheatstone bridge network with its four arms represented by the A and B filaments, which are connected in such a way, with pairs of A filaments (A1–A2, A3–A4) being balanced against pairs of B filaments (B1–B2, B3–B4), that the decrease in resistance of the A filaments and the increase in resistance of the B filaments provide additive electrical responses to increase the signal readout. In addition, by adjusting potentiometers 100 and 101 in the bridge circuit, it is possible to minimize thermal conductivity effects of the background gases in the mixture to be tested. These adjustments are made, first while one background gas is flowing through the cell and then while another background gas is flowing through the cell. In each case, the adjustment is made to give minimum deflection of meter M at a particular filament and cell temperature. The gases chosen in making these adjustments may be those gases in the mixture to be measured that may cause thermal cross-sensitivities, or they may merely be gases of widely different thermal conductivities. After the bridge has been adjusted to minimize thermal conductivity effects, there will usually be a residual meter deflection that must be compensated for. This is done by regulating a zero-adjusting potentiometer 102 for a meter reading of zero when the oxygen concentration is zero.

It is among the advantages of this invention that the design of the test chamber provides a minimum of resistance to gas flow therein, since there are no abrupt changes in direction in the path followed by the flow generated by the magnetic wind. In addition, the wind generating filaments and the sensing filaments are separately mounted in such a way that their positions relative to each other and to the magnetic field zones within the test chamber can be independently adjusted to obtain maximum sensitivity. This sensitivity is further increased by making the filaments in elongated forms and by disposing them in the test chamber so that they will have only a small cross section in the direction of gas flow generated by the magnetic wind, thereby assuring a sharp temperature gradient in the gas mixture adjacent the wind generating filaments. It is a further advantage of the cell design herein described, that it provides a maximum of heat transfer from the cooled to the heated filament of each pair of filaments, and also provides for maximum temperature differences in the gaseous mixture between successive pairs of filaments. The foregoing advantages are enhanced by the use of an electrical measuring circuit that improves sensitivity and reduces unwanted thermal effects.

It will be understood that this instrument will work if the B filaments are located on the other (clockwise) side of the A filaments in a region of maximum field intensity (but of substantially zero circumferential field intensity gradient) between the pole faces. In such case, the A filaments would still generate the magnetic wind, but the B filaments would be cooled by that wind and the A filaments warmed by it. However, the temperature differences between the two sets of filaments would not be as great as in the arrangement shown in FIG. 2, because of the absence of thermal insulation on the walls of the chamber between the two filaments. It will also be understood that the geometry of the test chamber and the arrangement of the magnetic field and filaments therein can be changed. For example, instead of the lines of maximum magnetic force crossing the annular test chamber in a radial direction, and instead of the filaments being mounted in that chamber parallel to its longitudinal axis, the chamber could be squeezed longitudinally and expanded radially, so that, while still annular in shape, it would be more like an annular disc than (as in the illustrated embodiment) a sleeve. In such case, the lines of maximum magnetic force would extend axially across the chamber and the filaments would be disposed substantially radially. One set of such filaments (for example, the A filaments) could be mounted on a movable ring forming the outer circumferential wall of the chamber and the second set of filaments (the B filaments) on a second movable ring forming the inner circumferential wall, each of those rings being independently rotatable relative to the cell body. On the other hand, by very accurate positioning of the filaments initially, it is possible to avoid having to provide for adjustment of them relative to one another. In that case, all of the filaments can be mounted on a single ring, but it still is desirable to be able to rotate the ring relative to the cell body in order to maximize the effect of the filaments on the pole pieces.

Figure 6:
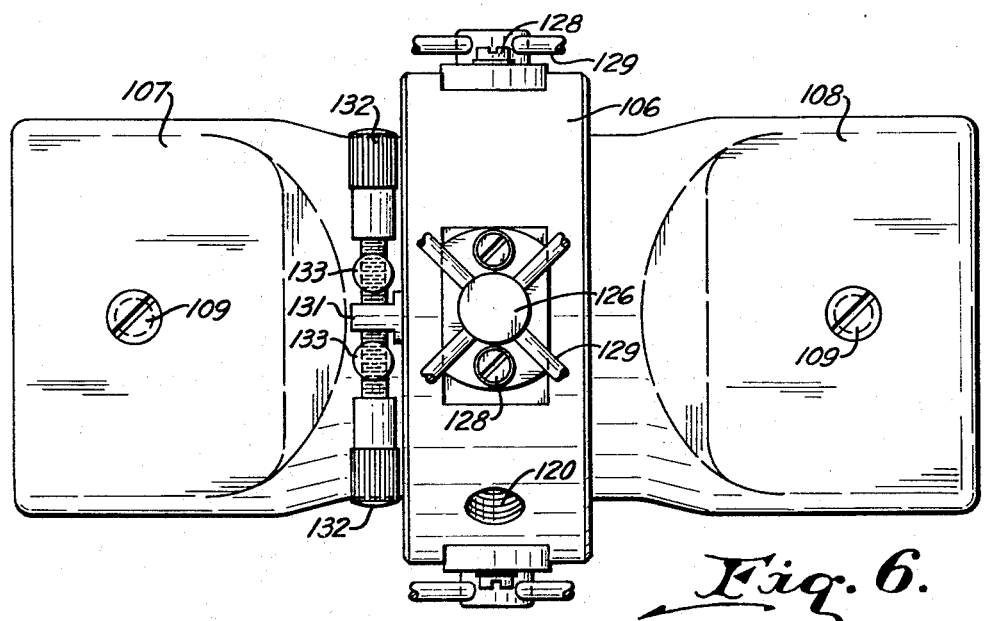
FIG. 6 is a plan view of a modification.
Figure 8:
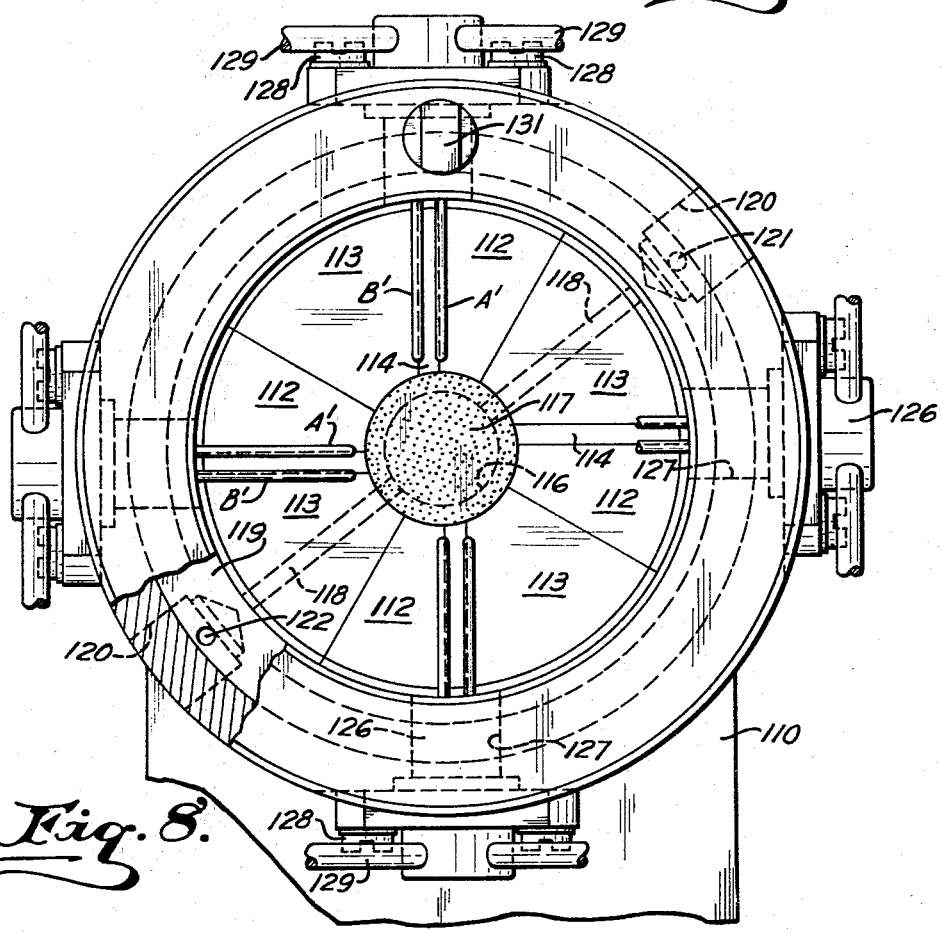
FIG. 8 is an end view into the test chamber, the inner end wall of the chamber having been removed.
Figure 7:
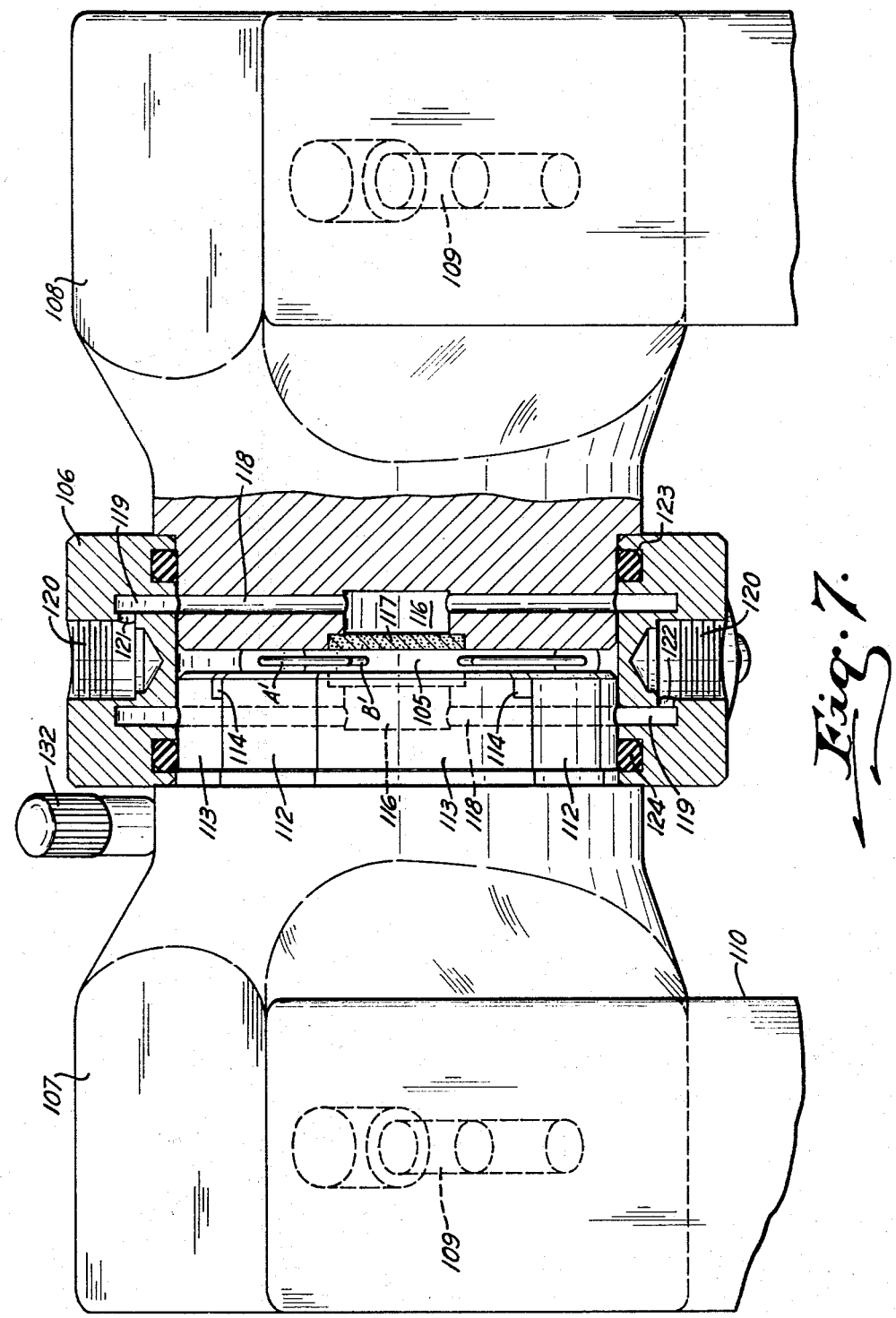
FIG. 7 is a longitudinal view, partly in section, along a plane through the gas inlet and outlet and with the magnet broken away.

An embodiment of the invention, in which the filaments are disposed substantially radially of the test chamber, is illustrated in FIGS. 6, 7 and 8. In this modification of the invention, the test chamber 105 has only an outer side wall, which is of generally circular shape, preferably cylindrical. This side wall can be formed by the inner surface of a heavy metal ring 106 that encircles the cylindrical inner end portions of a pair of opposed heavy metal bars 107 and 108 made of a magnetic material. The flat outer ends of the bars are secured by bolts 109 to the opposed ends of a horseshoe shaped magnet 110 (FIG. 7.) The inner end faces of these two bars form the spaced end walls of the test chamber.

Inside ring 106, each of the cylindrical members forming the chamber end walls is divided into a plurality, preferably four, of generally pie shaped pole pieces 112 that are spaced circumferentially from one another as shown in FIG. 8. The spaces between these pole pieces are filled by non-magnetic members 113. For best results, these members should be a good heat conductor and therefore metal. They should be non-magnetic such as brass or stainless steel for example. Along one side of each non-magnetic member, it is provided with a narrow slot in which there is a strip 114 of material that is a poor heat conductor, such as plastic. It will be seen that these strips are substantially radially disposed, although not on the exact radii of the chamber end walls because these strips are at one side of the joints between the pole pieces and the non-magnetic members 113.

As shown in FIG. 7, the center of each end wall of the test chamber is provided with an axial recess 116, the chamber end of which is closed by a gas permeable member 117, which may be a porous metal disc. Each of these recesses is connected by one or more radial passages 118 with an annular channel 119 in the encircling ring 106. Thus, there are two of these channels, which are spaced apart lengthwise of the ring. Between the two channels the ring is provided with a pair of inwardly extending radial bores 120, one of which is connected by a lateral hole 121 with one of the channels, and the other by a similar hole 122 with the other channel. One of the bores forms an inlet for the gaseous mixture being analyzed and the other forms an outlet for that mixture. If desired, each bore 120 could open into both channels. In that case the gas enters the test chamber by diffusion, providing less gas flow sensitivity. The ring also is provided with a pair of internal grooves 123 containing sealing rings 124 tightly engaging the cylindrical members projecting into the ring.

Unlike the filaments described in connection with the first embodiment of this invention, which extended substantially parallel to the axis of the test chamber, the filaments in this embodiment are disposed substantially radially of the test chamber. The two filaments A' and B' making up each pair are disposed side by side in closely spaced relation circumferentially of the test chamber. That is, the filaments lie in a plane perpendicular to the axis of the chamber. Each pair of filaments is accurately mounted in plug 126 that is inserted in a substantially radial opening 127 in ring 106, and is held in place by screws 128. Wires 129 connect the outer ends of the filaments into an electric circuit such as shown in FIG. 5. Normally, each pair of filaments is positioned between a pair of the plastic strips on the adjacent end walls of the test chamber.

As in the first embodiment, it may be desirable to adjust the filaments circumferentially relative to the plastic strips. That can be done by rotating the ring slightly in one direction or the other. To facilitate this adjustment of the ring, as shown in FIG. 6, it may be provided at one end with a lug 131 projecting between two opposed screws 132, each of which is threaded in a post 133 mounted in one of the metal bars 107 close beside the ring. By backing off one screw and turning the other forward, the lug can be moved sideways and this will turn the ring to adjust the filaments in the test chamber.

This device operates in the same general way as the one first described herein. The filaments are heated to substantially the same temperature in the absence of a paramagnetic gas. However, when such a gas enters the test chamber, the gas beside each pole piece will be heated by the nearest filament A' and will flow toward and across the other filament B' in that pair of filaments, thereby cooling the first filament and heating the second. Consequently, the gas will flow in a circumferential direction around the test chamber.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A device for measuring the concentration of a paramagnetic gas in a gaseous mixture, comprising a test chamber having a generally circular side wall, means for introducing the gaseous mixture into the chamber, means for providing a magnetic field with the lines of maximum magnetic force extending across the chamber, a pair of elongated temperature sensitive electrical resistance filaments disposed side by side in the chamber and spaced circumferentially thereof and extending in a direction substantially normal to the lines of maximum magnetic force therein, the first filament being disposed in a region of the magnetic field where the product of the field intensity and the circumferential field intensity gradient is a maximum, the second filament being disposed adjacent to the first filament but in a region of the magnetic field where the product of the field intensity and the circumferential field intensity gradient is a minimum, means for electrically heating both filaments to substantially the same temperature in the absence of a paramagnetic gas, thereby to create in the presence of such a gas a thermomagnetic gas flow circumferentially of the chamber in the direction of decreasing magnetic field intensity adjacent the first filament, and electrical means for measuring the cooling effect of such gas flow on one filament and its heating effect on the other filament.

2. A device according to claim 1, characterized by the fact that said test chamber is annular and said pair of elongated temperature sensitive electrical resistance filaments are disposed in the chamber substantially parallel to its longitudinal axis.

3. A device according to claim 1 that also includes means for adjusting the position of at least one filament extent, and in which the filaments extend substantially the entire axial length of the chamber and have a substantially round cross section.

20. Apparatus according to claim 13, in which the cylindrical walls of the chamber that subtend the arcuate space between the two filaments of each pair of filaments are made of thermal insulating material to decrease the transfer of heat from the gaseous mixture to those walls, thereby to increase the heating effect of said gas flow on the downstream filaments.

21. Apparatus according to claim 20, in which the cylindrical walls of the chamber that subtend the arcuate space between adjacent pairs of filaments are made of thermal conducting material to increase the transfer of heat from the gaseous mixture in contact with those walls, thereby to increase the temperature differential of the gaseous mixture between successive pairs of filaments.

References Cited by the Examiner

UNITED STATES PATENTS

| | | | |
|---|---|---|---|
| 2,603,964 | 7/1952 | Foley et al. | 73—27 |
| 2,658,385 | 11/1953 | Richardson | 73—27 |
| 2,807,159 | 9/1957 | Wilson | 73—27 |

FOREIGN PATENTS

| | | |
|---|---|---|
| 1,079,353 | 7/1960 | Germany. |

OTHER REFERENCES

Dyer: The Review of Scientific Instruments, "A Paramagnetic Oxygen Analyzer," Vol. 18, No. 10, October 1947, pages 696–702.

RICHARD C. QUEISSER, *Primary Examiner.*

JULIUS FISHER, *Assistant Examiner.*